United States Patent
Cao et al.

(10) Patent No.: US 11,342,752 B2
(45) Date of Patent: May 24, 2022

(54) ENERGY STORAGE SYSTEM AND MULTI-STAGE SHORT CIRCUIT PROTECTION SYSTEM THEREOF

(71) Applicant: SUNGROW POWER SUPPLY CO., LTD., Anhui (CN)

(72) Inventors: Wei Cao, Anhui (CN); Ri Fang, Anhui (CN); Xiaolei Wu, Anhui (CN)

(73) Assignee: SUNGROW POWER SUPPLY CO., LTD., Anhui (CN)

(*) Notice: Subject to any disclaimer, the term of this patent is extended or adjusted under 35 U.S.C. 154(b) by 0 days.

(21) Appl. No.: 17/005,024

(22) Filed: Aug. 27, 2020

(65) Prior Publication Data
US 2021/0075218 A1    Mar. 11, 2021

(30) Foreign Application Priority Data
Sep. 11, 2019    (CN) .......................... 201910859279.1

(51) Int. Cl.
*H02J 3/32* (2006.01)
*H02H 7/26* (2006.01)
*H02M 1/32* (2007.01)

(52) U.S. Cl.
CPC .............. *H02J 3/32* (2013.01); *H02H 7/268* (2013.01); *H02M 1/32* (2013.01)

(58) Field of Classification Search
CPC .......... H02J 3/32; H02J 7/0026; H02J 7/0034; H02H 7/268; H02H 3/087; H02M 1/32; Y02E 60/10; H01M 50/59
See application file for complete search history.

(56) References Cited

U.S. PATENT DOCUMENTS

| 2009/0268356 A1* | 10/2009 | Mollema ................ H02H 9/042 |
| | | 361/37 |
| 2018/0337385 A1 | 11/2018 | Schnakofsky |
| 2019/0189382 A1* | 6/2019 | Holland ............... H01H 85/046 |

FOREIGN PATENT DOCUMENTS

| CN | 201422021 Y | 3/2010 |
| CN | 103595014 A | 2/2014 |

(Continued)

OTHER PUBLICATIONS

Extended European Search Report regarding Application No. 20195035.9 dated Jan. 29, 2021.

(Continued)

*Primary Examiner* — Lincoln D Donovan
*Assistant Examiner* — Alex W Lam
(74) *Attorney, Agent, or Firm* — Harness, Dickey & Pierce, P.L.C.

(57) ABSTRACT

An energy storage system and a multi-stage short circuit protection system thereof are provided. The multi-stage short circuit protection system includes N stages of fuse units. Each battery pack is connected to a corresponding first-stage fuse unit, a direct-current side of a power conversion device is arranged with a third-stage fuse unit, and at least one second-stage fuse unit is arranged between multiple battery packs and the power conversion device. In a case that a short circuit fault occurs at a position on the direct-current side of the power conversion device, only a fuse unit at a stage preceding the position and a fuse unit at a stage following the position are broken, thereby avoiding a problem of a high maintenance cost in the conventional technology due to that all fuses are broken.

11 Claims, 7 Drawing Sheets

(56) References Cited

FOREIGN PATENT DOCUMENTS

| | | |
|---|---|---|
| CN | 103872752 A | 6/2014 |
| CN | 203794474 U | 8/2014 |
| CN | 104410105 A | 3/2015 |
| CN | 204761391 U | 11/2015 |
| CN | 206364767 U | 7/2017 |
| CN | 107425704 A | 12/2017 |
| CN | 109462253 A | 3/2019 |
| EP | 2315328 A2 | 4/2011 |
| EP | 3203595 A1 | 8/2017 |
| WO | WO-2015071721 A1 | 5/2015 |

OTHER PUBLICATIONS

First Chinese Office Action regarding Application No. 201910859279.1 dated Feb. 2, 2021. English translation provided by Unitalen Attorneys at Law.

* cited by examiner

US 11,342,752 B2

ENERGY STORAGE SYSTEM AND MULTI-STAGE SHORT CIRCUIT PROTECTION SYSTEM THEREOF

The present application claims priority to Chinese Patent Application No. 201910859279.1, titled "ENERGY STORAGE SYSTEM AND MULTI-STAGE SHORT CIRCUIT PROTECTION SYSTEM THEREOF", filed on Sep. 11, 2019 with the Chinese Patent Office, which is incorporated herein by reference in its entirety.

FIELD

The present disclosure relates to the field of automatic control technology, and in particular to an energy storage system and a multi-stage short circuit protection system thereof.

BACKGROUND

In an energy storage system, a short circuit fault occurring on a direct-current side of an energy storage inverter seriously affects safety of the energy storage system. In addition, with the promotion of the MW level energy storage inverter, the number of battery packs arranged on the direct-current side of the energy storage inverter is increasing, which may cause various complicated short circuit faults. Since a battery system is expensive, once a short circuit fault occurs on the direct-current side of the energy storage inverter without a safety, comprehensive and reliable protection design, a severe accident such as a fire accident may be caused, which may cause great loss in economic and property. Moreover, the problem described above is severe with respect to a large-capacity battery in the energy storage system.

A conventional technical solution for solving the above problem is as shown in FIG. 1. In FIG. 1, each of a positive electrode and a negative electrode of each battery pack in a battery cabinet is connected with an aR fuse. Currents are combined in a direct-current combiner box through an input positive-negative copper busbar of the direct-current combiner box, and then transmitted to a direct-current side positive-negative copper busbar of the energy storage inverter by an output positive-negative copper busbar of the direct-current combiner box after flowing through one or more switches K. In addition, each of a positive electrode and a negative electrode on a direct-current side of the energy storage inverter is generally connected with an aR fuse. In a case that a short circuit fault occurs at a point A, a point B or a point C as shown in FIG. 1, the aR fuse connected with each of the positive electrode and the negative electrode of each battery pack and the aR fuse connected with each of the positive electrode and the negative electrode on the direct-current side of the energy storage inverter are all broken.

However, with the technical solution as shown in FIG. 1, each time a short circuit fault occurs, it is required to replace the fuses arranged on the direct-current side of the energy storage inverter and the fuses connected with the positive electrode and the negative electrode of each battery pack in the battery cabinet, which results in a high maintenance cost. Moreover, the problem described above may be severe with respect to a large number of the battery packs on the direct-current side of the energy storage system.

SUMMARY

An energy storage system and a multi-stage short circuit protection system of the energy storage system are provided according to the present disclosure to solve a problem of a high maintenance cost on fuses in the conventional technology after a short circuit fault occurs.

The following technical solutions are provided according to the present disclosure.

According to a first aspect of the present disclosure, a multi-stage short circuit protection system of an energy storage system is provided. The multi-stage short circuit protection system includes N stages of fuse units, where N is a positive integer greater than 2.

Each of multiple battery packs in a battery cabinet in the energy storage system transmits electric energy through a branch in which a first-stage fuse unit corresponding to the battery pack is arranged.

The multiple battery packs are connected to a direct-current side positive-negative copper busbar of a power conversion device of the energy storage system by sharing at least one branch in which a second-stage fuse unit is arranged.

The direct-current side positive-negative copper busbar of the power conversion device is connected to a main circuit of the power conversion device at a direct-current side of the power conversion device through a branch in which a third-stage fuse unit is arranged.

In a case that a short circuit fault occurs at a position on the direct-current side of the power conversion device of the energy storage system, a fuse unit at a stage preceding the position and a fuse unit at a stage following to the position are broken.

In an embodiment, a direct-current combiner box of the energy storage system includes p combiner units, and each of the p combiner units includes one output positive-negative copper busbar and q input positive-negative copper busbars, where p and q are positive integers.

Each of the input positive-negative copper busbar is configured to transmit electric energy between n battery packs and the output positive-negative copper busbar, where n is a positive integer.

The output positive-negative copper busbar is connected to the direct-current side positive-negative copper busbar of the power conversion device of the energy storage system through a branch in which a second-stage fuse unit is arranged.

In an embodiment, N is equal to 3.

A rated current of the first-stage fuse unit is less than a rated current of the second-stage fuse unit.

The rated current of the second-stage fuse unit is less than a rated current of the third-stage fuse unit.

In an embodiment, N is equal to 4, and for each of the combiner units, each of the input positive-negative copper busbars in the combiner unit is connected to the output positive-negative copper busbar in the combiner unit through a branch in which a fourth-stage fuse unit is arranged.

A rated current of the first-stage fuse unit is less than a rated current of the fourth-stage fuse unit.

The rated current of the fourth-stage fuse unit is less than a rated current of the second-stage fuse unit.

The rated current of the second-stage fuse unit is less than a rated current of the third-stage fuse unit.

In an embodiment, in a case that a short circuit fault occurs at a first position between the fourth-stage fuse unit and an input positive-negative copper busbar connected to the fourth-stage fuse unit, the fourth-stage fuse unit and first-stage fuse units connected to the input positive-negative copper busbar are broken.

In a case that a short circuit fault occurs at a second position between the second-stage fuse unit and the output positive-negative copper busbar connected to the second-stage fuse unit, the second-stage fuse unit and fourth-stage fuse units connected to the output positive-negative copper busbar are broken.

In a case that a short circuit fault occurs at a third position between the third-stage fuse unit and the direct-current side positive-negative copper busbar, the third-stage fuse unit and second-stage fuse units connected to the direct-current side positive-negative copper busbar are broken.

In a case that a short circuit fault occurs at a fourth position between the first-stage fuse unit and an input positive-negative copper busbar connected to the first-stage fuse unit, first-stage fuse units connected to the input positive-negative copper busbar and the fourth-stage fuse unit connected to the input positive-negative copper busbar are broken.

In a case that a short circuit fault occurs at a fifth position between the fourth-stage fuse unit and an output positive-negative copper busbar connected to the fourth-stage fuse unit, fourth-stage fuse units connected to the output positive-negative copper busbar and the second-stage fuse unit connected to the output positive-negative copper busbar are broken.

In a case that a short circuit fault occurs at a sixth position between the second-stage fuse unit and the direct-current side positive-negative copper busbar, second-stage fuse units connected to the direct-current side positive-negative copper busbar and the third-stage fuse unit are broken.

In an embodiment, each of the N stages of fuse units comprises a first fuse and a second fuse, which are respectively arranged in a positive branch and a negative branch of a branch in which the fuse unit is arranged.

At least one of the first fuse and the second fuse is a quick-protection fuse.

In an embodiment, in each fuse unit in the direct-current combiner box, the first fuse is a short circuit quick-protection fuse and the second fuse is an overload protection fuse.

In an embodiment, a rated current of the first fuse in the second-stage fuse unit is greater than or equal to current carrying value of a branch in which the second-stage fuse unit is arranged.

A rated current of the second fuse in the second-stage fuse unit is less than the current carrying value of the branch in which the second-stage fuse unit is arranged.

According to another aspect of the present disclosure, an energy storage system is further provided. The energy storage system includes a battery cabinet, a direct-current combiner box, a power conversion device and any multi-stage short circuit protection system of an energy storage system described above.

The battery cabinet includes p battery units, and each of the p battery units includes q×n battery packs.

The direct-current combiner box includes p combiner units, and each of the p combiner units includes one output positive-negative copper busbar and q input positive-negative copper busbars connected to the output positive-negative copper busbar.

Each of the battery packs is connected to an input positive-negative copper busbar corresponding to the battery pack through a branch in which a first-stage fuse unit corresponding to the battery pack is arranged.

The output positive-negative copper busbar is connected to the direct-current side positive-negative copper busbar of the power conversion device through a branch in which a second-stage fuse unit is arranged.

The direct-current side positive-negative copper busbar is connected to the main circuit of the power conversion device at the direct-current side of the power conversion device through a branch in which the third-stage fuse unit is arranged.

In an embodiment, for each of the combiner units, each of the input positive-negative copper busbars in the combiner unit is connected to the output positive-negative copper busbar through a branch in which a fourth-stage fuse unit is arranged.

In an embodiment, a branch in which a second-stage fuse unit is arranged further includes a bidirectional switch arranged between the second-stage fuse unit and an output positive-negative copper busbar connected to the second-stage fuse unit.

In an embodiment, the power conversion device is an energy storage inverter, a direct-current converter, or a photovoltaic inverter.

The multi-stage short circuit protection system of an energy storage system according to the present disclosure includes N stages of fuse units. Each battery pack is connected to a corresponding first-stage fuse unit, a direct-current side of a power conversion device is arranged with a third-stage fuse unit, and at least one second-stage fuse unit is arranged between multiple battery packs and the power conversion device. In a case that a short circuit fault occurs at a position on the direct-current side of the power conversion device, only a fuse unit at a stage preceding the position and a fuse unit at a stage following the position are broken, thereby avoiding a problem of a high maintenance cost in the conventional technology due to that all fuses are broken.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

Technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

In this specification, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

A multi-stage short circuit protection system of an energy storage system is provided according to the present disclosure, to solve a problem of a high maintenance cost on fuses in the conventional technology due to a short circuit fault.

Figure 2:
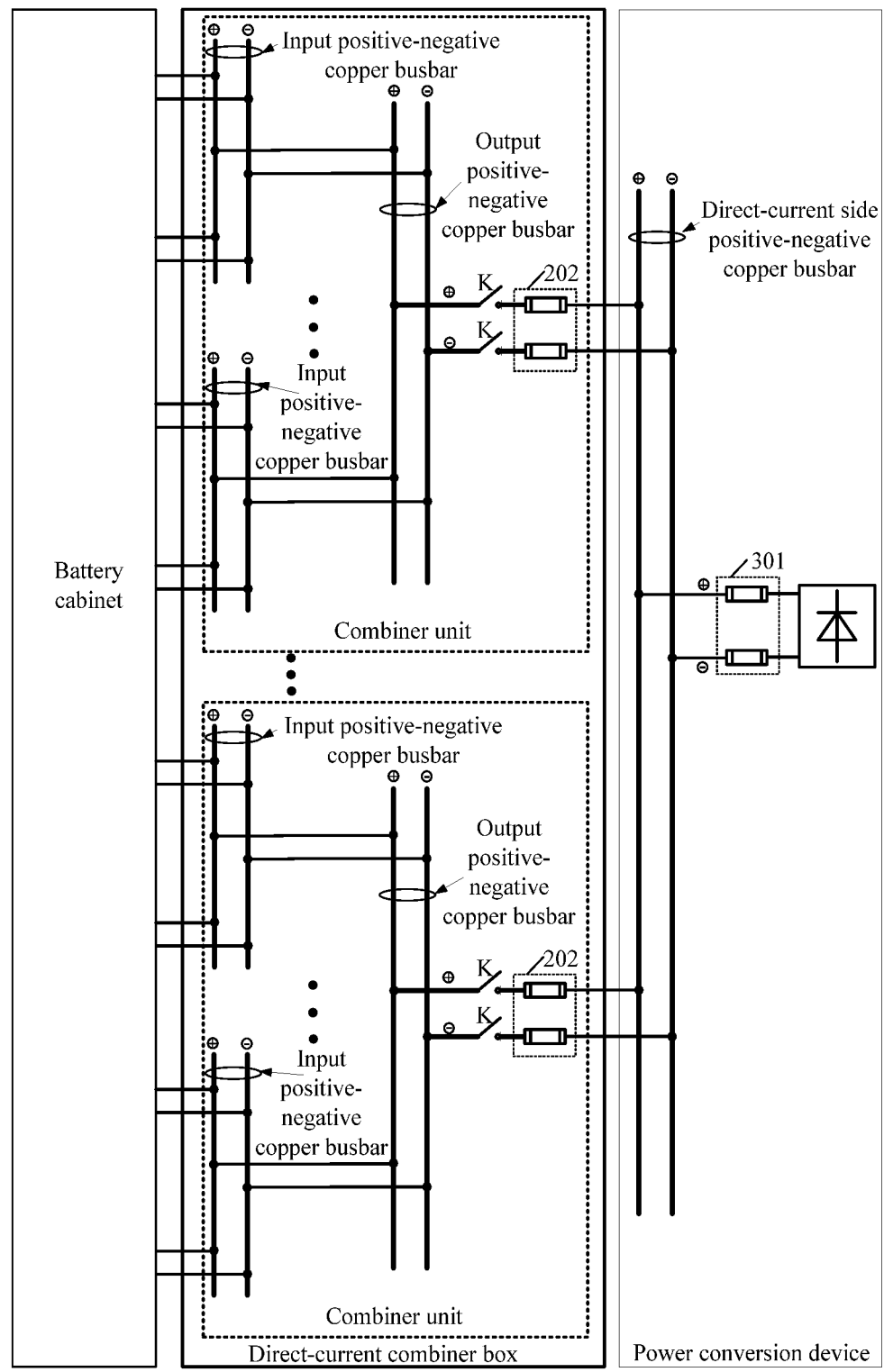
FIG. 2 to FIG. 4 are diagrams each showing a combiner architecture of an energy storage system according to an embodiment of the present disclosure.
Figure 3:
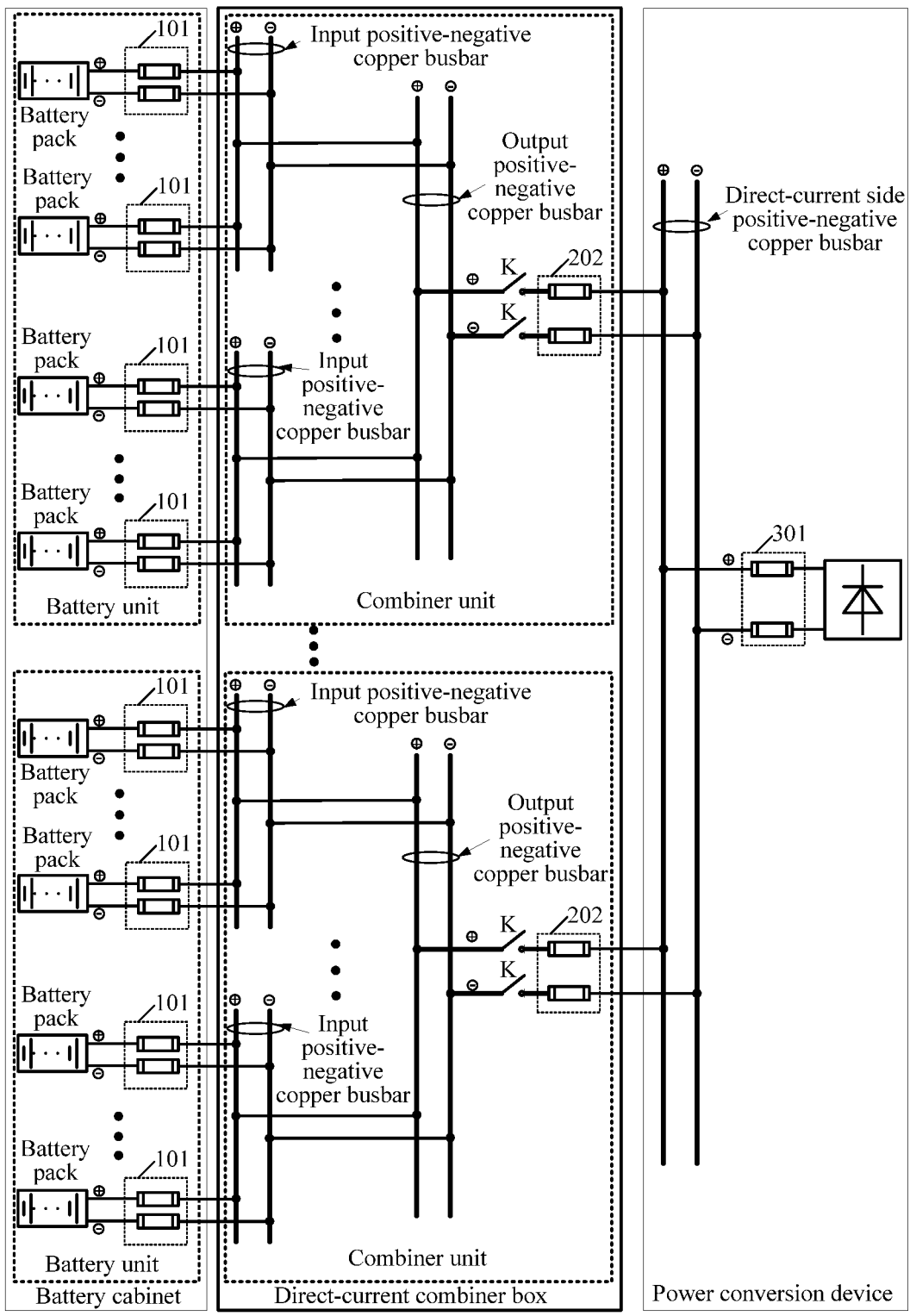
Figure 4:
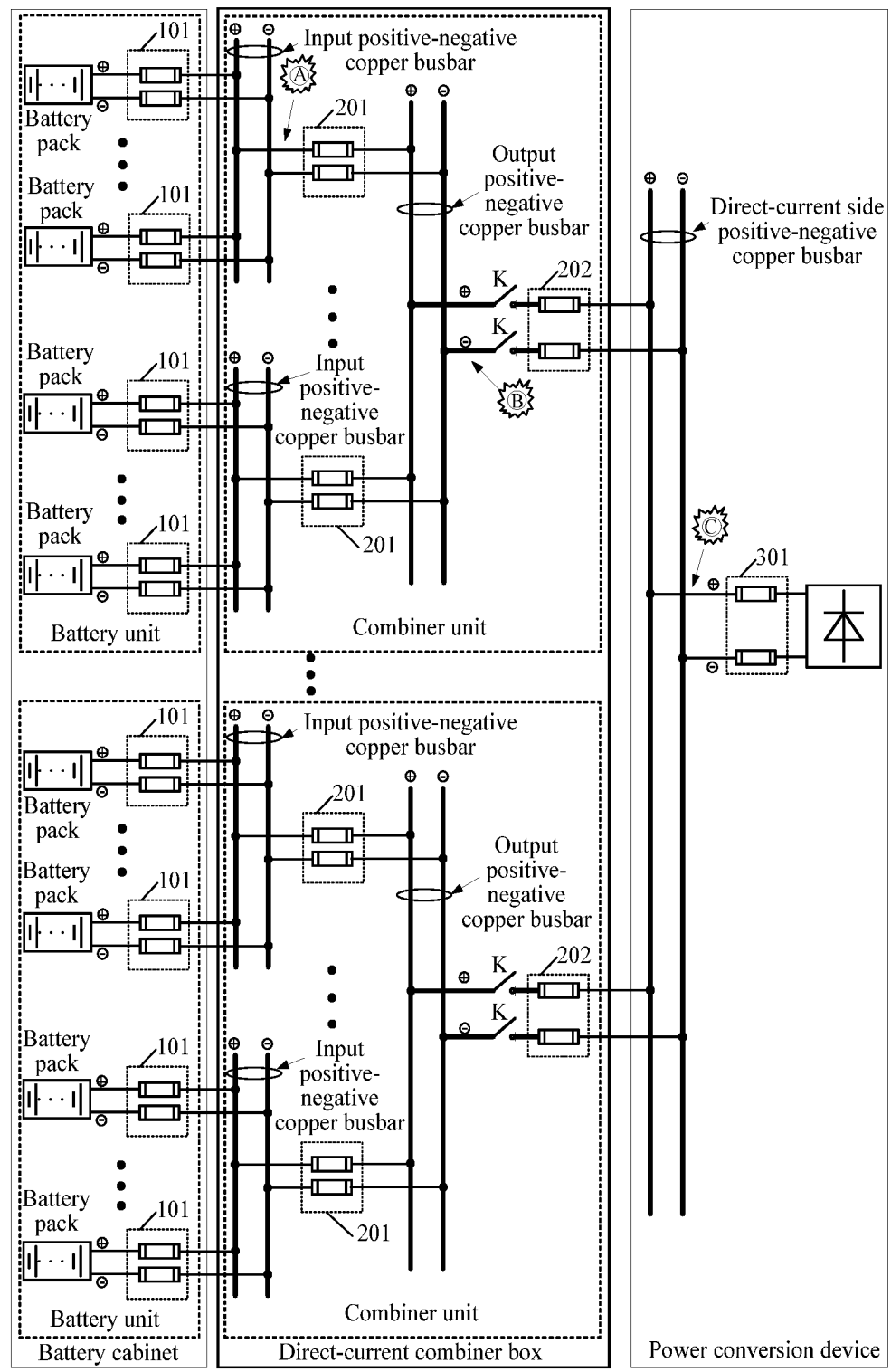

Specifically, the multi-stage short circuit protection system of an energy storage system includes N stages of fuse units, where N is a positive integer greater than two. FIG. 2 and FIG. 3 show examples in which N is equal to 3. FIG. 4 shows an example in which N is equal to 4. In practice, more stages of fuse units may be used according to specific application conditions, which is not limited herein and is within the protection scope of the present disclosure.

As shown in FIG. 3 and FIG. 4, each battery pack in a battery cabinet of the energy storage system transmits electric energy through a branch in which a first-stage fuse unit 101 corresponding to the battery pack is arranged.

Multiple battery packs are connected to a direct-current side positive-negative copper busbar of a power conversion device in the energy storage system by sharing at least one branch in which a second-stage fuse unit 202 is arranged.

Specifically, as shown in FIG. 2 to FIG. 4, a direct-current combiner box in the energy storage system includes p combiner units. Each of the p combiner units includes one output positive-negative copper busbar and q input positive-negative copper busbars, where p and q are positive integers. In each of the p combiner units, each of the input positive-negative copper busbars is configured to transmit electric energy between n battery packs and the output positive-negative copper busbar, where n is a positive integer. The output positive-negative copper busbar is further connected to the direct-current side positive-negative copper busbar of the power conversion device through a branch in which a second-stage fuse unit 202 is arranged.

FIG. 2 and FIG. 3 each shows an example in which N is equal to 3 and multiple battery packs are connected to the direct-current side positive-negative copper busbar by sharing a branch in which a second-stage fuse unit 202 is arranged. FIG. 4 shows an example in which N is equal to 4, multiple battery packs are connected to an output positive-negative copper busbar of the direct-current combiner box by sharing a branch in which a fourth-stage fuse unit 201 is arranged, and multiple input positive-negative copper busbars are connected to the direct-current side positive-negative copper busbar of the power conversion device by sharing a branch in which a second-stage fuse unit 202 is arranged.

As shown in FIG. 2 to FIG. 4, the direct-current side positive-negative copper busbar of the power conversion device is connected to a main circuit of the power conversion device at a direct-current side of the power conversion device through a branch in which a third-stage fuse unit 301 is arranged.

With the arrangement of N stages of fuse units described above, in a case that a short circuit fault occurs at a position on the direct-current side of the power conversion device in the energy storage system, only a fuse unit at a stage preceding the position and a fuse unit at a stage following the position are broken, which avoids the problem of a high maintenance cost in the conventional technology due to that all fuses are broken.

It is to be noted that, in practice, each fuse unit includes a first fuse and a second fuse that are respectively arranged in a positive branch and a negative branch of a branch in which the fuse unit is arranged. In addition, at least one of the first fuse and the second fuse is a quick-protection fuse. The short circuit protection principle of the energy storage system with the multiple-stage short circuit protection system is described in detail via a simplified single line diagram hereinafter.

Figure 5:
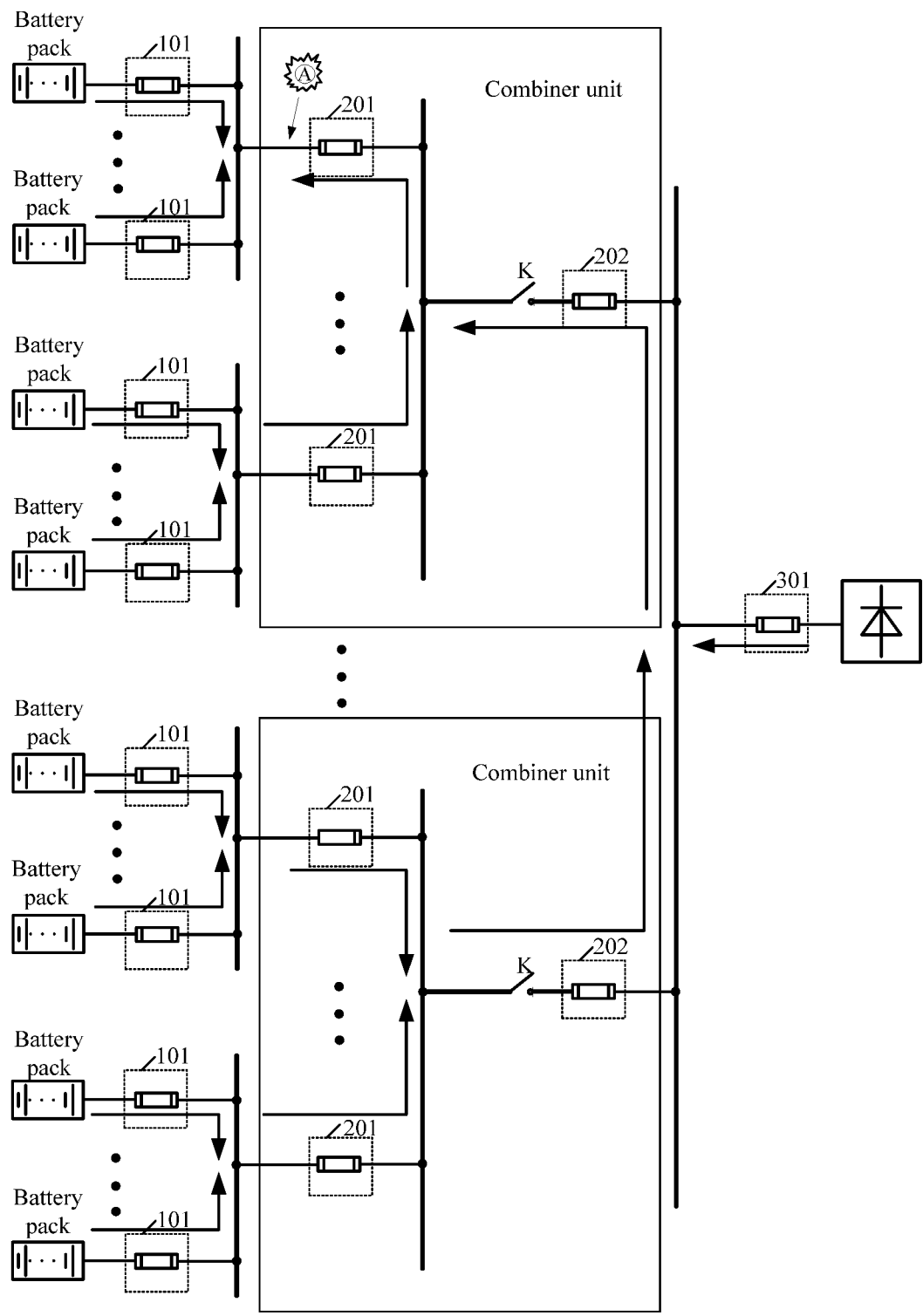
FIG. 5 to FIG. 7 are schematic diagrams each showing a single-line path of a short circuit current in an energy storage system according to an embodiment of the present disclosure.
Figure 6:
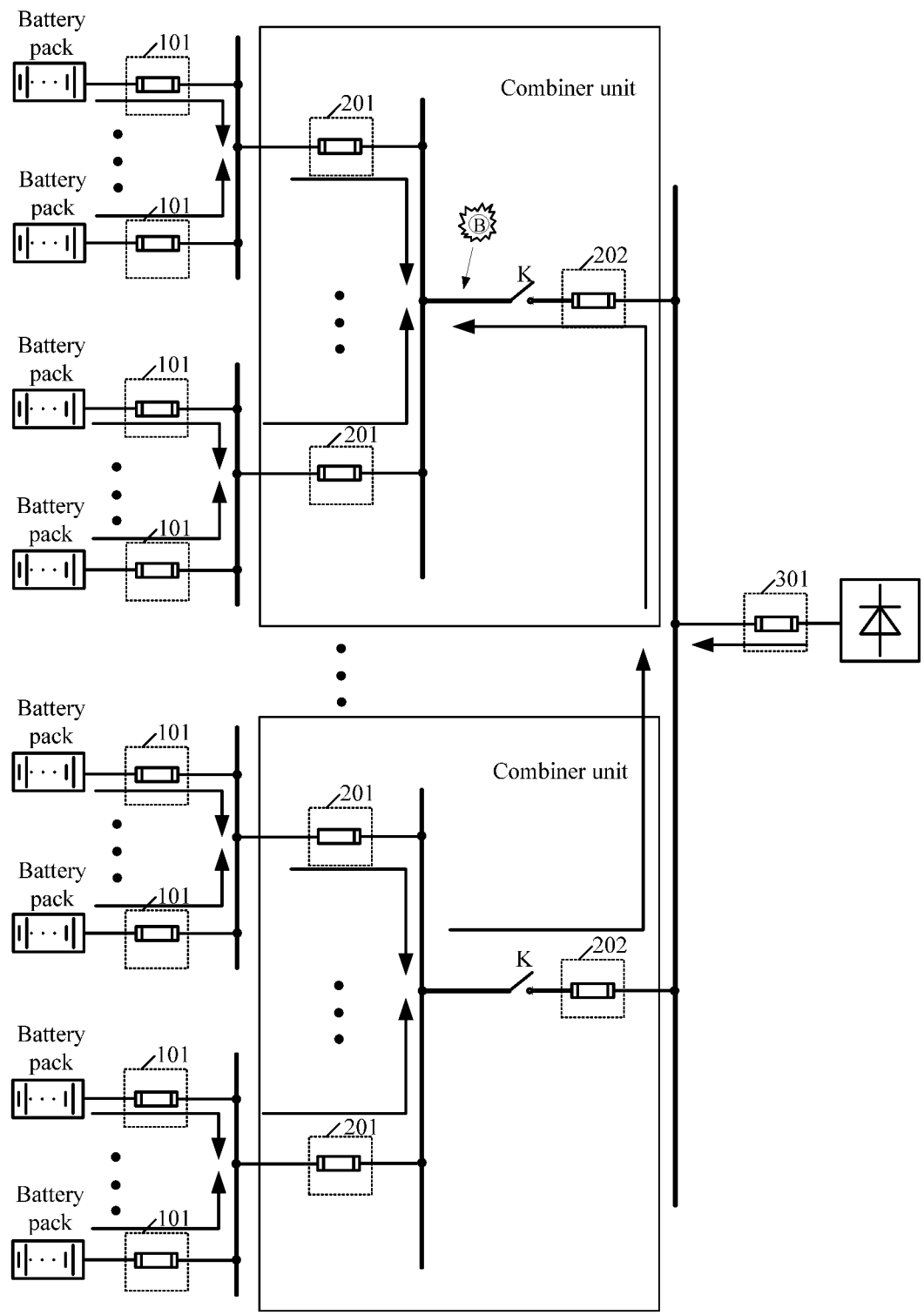
Figure 7:
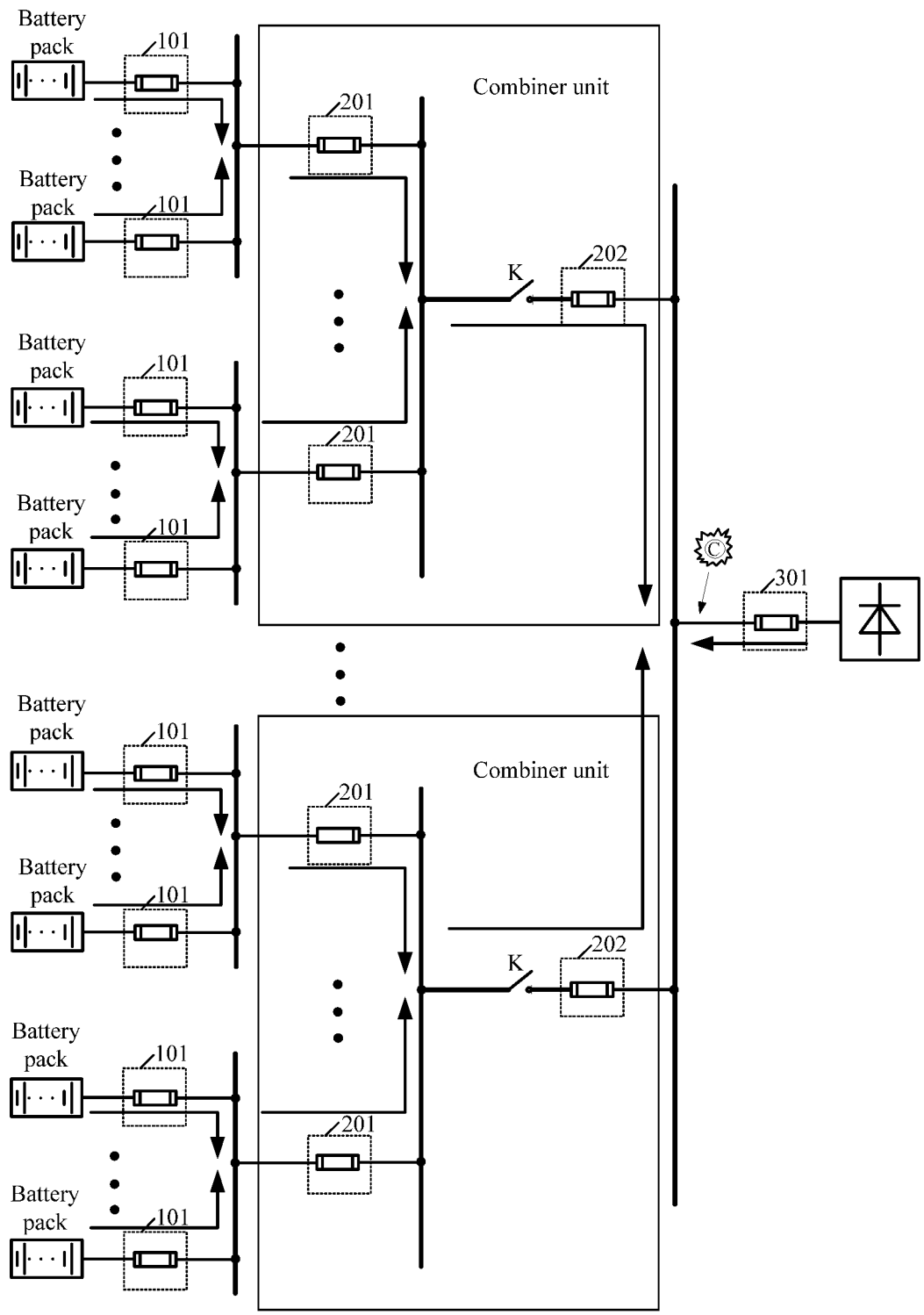

A structure as shown in FIG. 4 is taken as an example. As shown in FIG. 5 to FIG. 7, only a short circuit fault that may occur at each stage is considered. The types of fuses in each fuse unit are required to be determined such that a fuse with a small rated current is broken prior to a fuse with a large rated current under the same expectant short-circuit current, which is suitable in practical engineering applications. Fuses in each fourth-stage fuse unit 201 have the same type. Fuses in each second-stage fuse unit 202 have the same type.

In the energy storage system, a rated current of the third-stage fuse unit 301 of the power conversion device is greater than a rated current of the second-stage fuse unit 202. The rated current of the second-stage fuse unit 202 is greater than a rated current of the fourth-stage fuse unit 201. The rated current of the fourth-stage fuse unit 201 is greater than a rated current of the first-stage fuse unit 101.

A combiner unit shown at the top of each of FIG. 4 to FIG. 7 is taken as an example. In a case that a short circuit fault occurs at a first position (for example, a point A in FIG. 4) between an input positive-negative copper busbar and a fourth-stage fuse unit 201 connected to the input positive-negative copper busbar, a short-circuit current flows through each stage along a direction as shown in FIG. 5. It is apparent that a short-circuit current flowing through the fourth-stage fuse unit 201 in the combiner unit is maximum, such that the fourth-stage fuse unit 201 in the combiner unit is broken first, to eliminate the short circuit fault point A, so as to ensure that, in the battery cabinet, all battery units other than the battery unit (the battery unit shown at the top of each of FIG. 4 to FIG. 7) connected to the combiner unit are isolated from the short-circuit fault point A. For the battery packs in the battery unit which is connected to the combiner unit, in order to eliminate the short circuit fault point A, all fuse units connected to the battery packs are broken. Therefore, in a case that a short circuit fault occurs at the point A, on the direct-current side of the energy storage system, fuses of the fourth-stage fuse unit 201 in the direct-current combiner unit and fuses of a first-stage fuse unit 101 in the battery cabinet which is connected to each input positive-negative copper busbar of the combiner unit are all broken.

Figure 1:
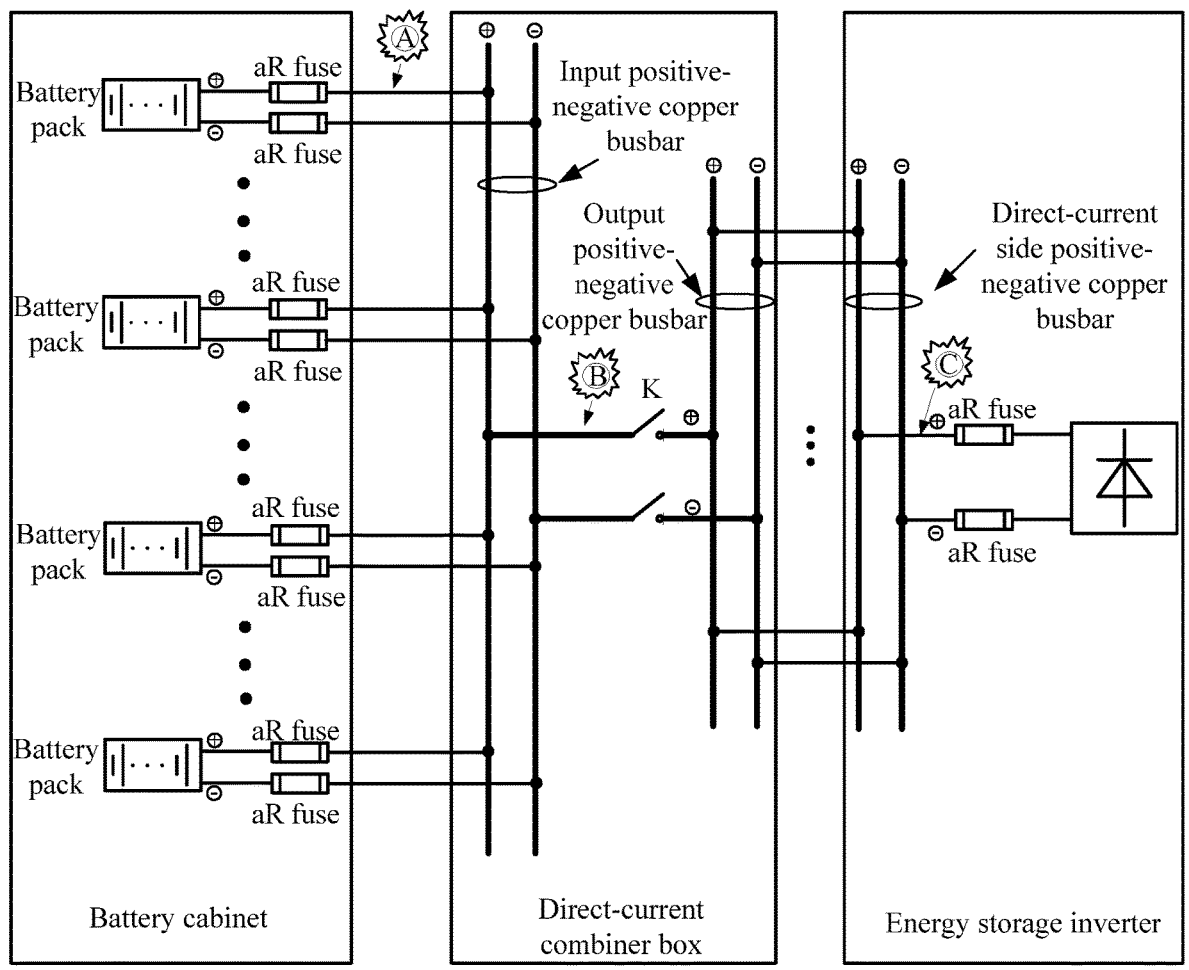
FIG. 1 is a diagram showing a combiner architecture of an energy storage system according to the conventional technology.

However, with the conventional technical solution as shown in FIG. 1, in a case that a short circuit fault occurs at the point A, fuses of the first-stage fuse unit 101 in each battery unit of the battery cabinet are all broken, and fuses of the third-stage fuse unit 301 of the power conversion device are also broken, which results in a high maintenance cost.

The combiner unit shown at the top of each of FIG. 4 to FIG. 7 is also taken as an example. In a case that a short circuit fault occurs at a second position (for example, a point B in FIG. 4) between the output positive-negative copper busbar and the second-stage fuse unit 202, as shown in FIG.

6, it is apparent that a short-circuit current flowing through the second-stage fuse unit 202 is maximum, such that the second-stage fuse unit 202 is broken first, to eliminate the short-circuit fault point B, so as to ensure that, in the battery cabinet, all battery units other than the battery unit (the battery unit shown at the top of each of FIG. 4 to FIG. 7) connected to the combiner unit are isolated from the short-circuit fault point B. For the battery packs in the battery unit which is connected to the combiner unit, in order to eliminate the short-circuit fault point B, there are two breaking ways. In one breaking way, the first-stage fuse units 101 in the battery unit connected to the combiner unit are all broken. In the other breaking way, the fourth-stage fuse units 201 in the combiner unit are all broken. The types of the fuses are properly determined such that there is an option between the first-stage fuse units 101 and the fourth-stage fuse units 201, and a result of the other breaking way can be obtained easily. That is, the fourth-stage fuse units 201 in the combiner unit are all broken. Therefore, in a case that a short circuit fault occurs at the point B, the fourth-stage fuse units 201 and the second-stage fuse unit 202 in the combiner unit on the direct-current side of the energy storage system are all broken.

However, with the conventional technical solution as shown in FIG. 1, in a case that a short-circuit fault occurs at the point B, the first-stage fuse units 101 in each battery unit of the battery cabinet are all broken, and the third-stage fuse unit 301 of the power conversion device is also broken, which results in a high maintenance cost.

In addition, in a case that a short-circuit fault occurs at a third position (for example, a point C in FIG. 4) between the direct-current side positive-negative copper busbar of the power conversion device and the third-stage fuse unit 301, as shown in FIG. 7, for the p combiner units and a combination of each combiner unit and a battery unit connected thereto, the same operation condition is obtained. In this case, three are three possible breaking ways, which are described by taking the combiner unit on the top of each of FIG. 4 to FIG. 7 as an example. In a first breaking way, the first-stage fuse units 101 in the battery unit connected to the combiner unit are all broken. In a second breaking way, the fourth-stage fuse units 201 in this combiner unit are all broken. In a third breaking way, the second-stage fuse unit 202 in the combiner unit is broken. The types of the fuses are properly determined such that there is an option fuses respectively arranged in the first-stage fuse unit 101, the fourth-stage fuse unit 201 and the second-stage fuse unit 202, and a result of the third breaking way can be obtained easily. That is, the second-stage fuse unit 202 in the combiner unit is broken. Therefore, in a case that a short circuit fault occurs at the point C, the second-stage fuse unit 202 in the combiner unit of the direct-current combiner box on the direct-current side of the energy storage system and the third-stage fuse unit 301 of the power conversion device are all broken.

However, with the conventional technical solution as shown in FIG. 1, in a case that a short-circuit fault occurs at the point C, the first-stage fuse units 101 in each battery unit of the battery cabinet are all broken, and the third-stage fuse unit 301 of the power conversion device is also broken, which results in a high maintenance cost.

In addition, in a case that a short-circuit fault occurs at a fourth position between one of the first-stage fuse units 101 and an input positive-negative copper busbar connected to the first-stage fuse unit 101, the first-stage fuse unit 101 and a fourth-stage fuse unit 201 connected to the input positive-negative copper busbar are broken. In a case that a short-circuit fault occurs at a fifth position between one of the fourth-stage fuse units 201 and an output positive-negative copper busbar connected to the fourth-stage fuse unit 201, the fourth-stage fuse unit 201 and a second-stage fuse unit 202 connected to the output positive-negative copper busbar are broken. In a case that a short-circuit fault occurs at a sixth position between one of the second-stage fuse units 202 and the direct-current side positive-negative copper busbar, the second-stage fuse unit 202 and the third-stage fuse unit 301 are broken. Principles can be inferred from the above description, which are not repeated herein.

As can be seen from the above, in the multi-stage short circuit protection system shown in FIG. 4, each battery pack in the battery cabinet is connected with a corresponding first-stage fuse unit 101. In each combiner unit, each of the q input positive-negative copper busbars is connected to the output positive-negative copper busbar through a corresponding fourth-stage fuse unit 201, and the output positive-negative copper busbar outputs current through a second-stage fuse unit 202. The direct-current side of the power conversion device is arranged with the third fuse unit 301. In this way, the energy storage system can perform a multi-stage short circuit protection based on above principles. Therefore, for a MW-level energy storage system, no matter a short circuit fault occurs at any point on a direct-current side, a minimum number of fuses are broken on the direct-current side, to eliminate a short-circuit fault point, thereby avoiding a problem of a high maintenance cost in the conventional technical solution due to that all fuses on the direct-current side are broken.

In the short circuit protection solutions as shown in FIG. 2 and FIG. 3, the fourth-stage fuse units 201 are omitted, and the short circuit protection principle is the same as that described above, that is, a fuse unit at a stage preceding the short circuit fault position and a fuse unit at a stage following the short circuit fault position are all broken, details are not repeated herein. In addition, in a case that the direct-current combiner box has another combiner structure, more stages of fuse units may be used, which is determined depending on specific application conditions and is within the protection scope of the present disclosure.

It is to be noted that, with the conventional technical solution as shown in FIG. 1, in a case that a short circuit fault occurs on the direct-current side of the energy storage inverter, a short circuit current on the direct-current side of the energy storage inverter is a sum of short circuit currents of all battery packs, a value of which depends on a peak value of a short circuit current in each battery pack and a current limiting property of each fuse in the battery cabinet. At present, an outputted short-circuit current may be limited to range from 6 kA to 8 kA with a fuse connected to each battery pack in a conventional battery cabinet, which results in a large short circuit current when a short circuit fault occurs on the direct-current side of the energy storage inverter. The short circuit current may even reach 300 kA in a large-capacity energy storage system. However, a conventional short circuit fuse can hardly have a breaking capacity of 300 kA. Therefore, the conventional technical solution is hardly compatible with a conventional energy storage inverter in the large-capacity energy storage system.

In the multi-stage short circuit protection system according to the embodiment, current is limited by the multiple stages of fuse units. In a case that a short circuit fault occurs on the direct-current side of the power conversion device (for example, an energy storage inverter), a maximum short-circuit current on the direct-current side depends on a current limiting property of fuses of a second-stage fuse unit 202 in each combiner unit rather than a current limiting property of aR fuses connected to each battery pack. Therefore, a peak value of the short circuit current on the direct-current side of the power conversion device can be reduced by properly determining the types of fuses in the second-stage fuse unit 202, which increases a capacity of a battery configured by the power conversion device and improves a compatibility of the power conversion device in the energy storage system, such that the energy storage system and the power conversion device can be configured flexibly. It is to be noted that in the multi-stage short circuit protection system according to the embodiment, since a protection configuration in the battery cabinet is not modified, batteries from any manufacturers can be arranged in the battery cabinet, which is beneficial for popularization.

In addition, in the conventional technical solution as shown in FIG. 1, since a positive electrode and a negative electrode of each battery pack is connected with an aR fuse that is not in a complete breaking range, the battery packs cannot be protected from an overload fault. Therefore, a direct-current combiner box is further provided according to another embodiment of the present disclosure. Based on above embodiments, preferably, in each fuse unit in the direct-current combiner box, the first fuse is a short circuit quick-protection fuse, and the second fuse is an overload protection fuse. The short circuit quick-protection fuse includes, but is not limited to, an aR fuse, and the overload protection fuse includes, but is not limited to, a gPV fuse.

Moreover, in practice, the short circuit quick-protection fuse may be arranged in a positive branch and the overload protection fuse may be arranged in a negative branch. Alternatively, the short circuit quick-protection fuse may be arranged in the negative branch and the overload protection fuse may be arranged in the positive branch, which is not limited herein and is within the protection scope of the present disclosure.

As shown in FIG. 4, in the direct-current combiner box according to the embodiment, the short circuit protection fuse and the overload protection fuse are used in cooperation. Each of all positive branches is arranged with a short circuit quick-protection fuse that is quickly broken when a short circuit fault occurs. Each of all negative branches is arranged with an overload protection fuse that has a wide breaking range. In a case that multiple currents from the battery packs are combined, output of some battery packs may be in an overload state due to difference in installation process of the battery packs and components on the direct-current side, as well as an abnormal operation of a battery pack. Therefore, with the solution as shown in FIG. 1, since each of the positive electrode and the negative electrode is connected with a short-circuit protection fuse, the components on the direct-current side cannot be effectively protected when an overload fault occurs in the battery pack. However, with the technical solution according to the embodiment, each of the negative branches is arranged with an overload protection fuse, such that components on the direct-current side can be protected from an overload fault. In addition, in order not to affect performance of a short circuit protection, the type of the overload protection fuse arranged in each negative branch is determined such that the overload protection fuse has the same short circuit breaking capacity as the short circuit fuse arranged in each positive branch.

Since the positive branch is arranged with a short circuit quick-protection fuse and the negative branch is arranged with an overload protection fuse, the overload protection and the short circuit protection can be both realized, thereby effectively ensuring safety of the energy storage system. Moreover, the above two types of fuses described above are used in cooperation in the architecture as shown in FIG. 4, such that not only a problem of uneven current distribution due to parallel connection of multiple cables can be avoided, but also an overload fault due to the uneven current distribution can be prevented. In addition, with a cooperation of the two types of fuses, current limiting can be performed on a stage basis, such that when an overload fault occurs at a point on the direct-current side of the energy storage system, a minimum number of fuses on the direct-current side are broken to eliminate a short circuit fault point.

Preferably, in the second-stage fuse unit 202, a rated current of the first fuse is greater than or equal to a current carrying value of a branch in which the second-stage fuse unit 202 is arranged. A rated current of the second fuse is less than the current carrying value of the branch in which the second-stage fuse unit 202 is arranged. For example, the second fuse is configured as an overload protection fuse with a rated current of 400 A, and a 500 kcmil power cable with a current carrying value of 430 A is used as a single cable in the branch in which the second fuse is arranged. That is, in addition that each of a positive electrode and a negative electrode of each combiner unit is independently connected with a single cable, the negative electrode of the combiner unit is further connected with an overload fuse, which can perform overload protection on the power cables connected to the positive electrode and the negative electrode.

An energy storage system is further provided according to another embodiment of the present disclosure, as shown in FIG. 2 to FIG. 4. The energy storage system includes a battery cabinet, a direct-current combiner box, a power conversion device, and the multi-stage short circuit protection system of an energy storage system according to anyone of embodiments described above.

The battery cabinet is arranged with p battery units, and each of the p battery units includes q×n battery packs, where p, q and n are positive integer.

The direct-current combiner box includes p combiner units, and each of the p combiner units includes one output positive-negative copper busbar and q input positive-negative copper busbars connected to the output positive-negative copper busbar.

The power conversion device may be a power electronic power conversion device such as an energy storage inverter, a direct-current converter, and a photovoltaic inverter. In a case that the power conversion device is a direct-current converter, the direct-current side described above refers to a direct-current side on which the batteries are connected.

A positive electrode and a negative electrode of each battery pack are connected to one side of a first-stage fuse unit 101 corresponding to the battery pack, and the other side of the first-stage fuse unit 101 is connected to an input positive-negative copper busbar corresponding to first-stage fuse unit 101.

In each combiner unit, each input positive-negative copper busbar can combine electric energy from multiple battery packs connected to the input positive-negative copper busbar and outputs the combined electric energy to an output positive-negative copper busbar corresponding to the input positive-negative copper busbar. The output positive-negative copper busbar may be directly connected to the input positive-negative copper busbar through a cable, or through a fourth-stage fuse unit 201 (as shown in FIG. 4). The output positive-negative copper busbar combines electric energy from q input positive-negative copper busbars and outputs the collected electric energy to the direct-current side positive-negative copper busbar of the power conversion device through a bidirectional switch K and a second-stage fuse unit 202. Further, the direct-current side positive-negative copper busbar of the power conversion device can combine electric energy outputted from the p combiner units.

The direct-current side positive-negative copper busbar is connected to a main circuit of the power conversion device at the direct-current side of the power conversion device through a branch in which the third-stage fuse unit 301 is arranged.

It is to be noted that, in the technical solution as shown in FIG. 1, since multiple cables are connected in parallel with each other between the direct-current combiner box and the direct-current side of the energy storage inverter, an uneven current distribution among the multiple cables may be caused due to differences of processes and differences of the cables. However, the technical solution as shown in FIG. 1 cannot avoid the uneven current distribution among the multiple cables.

In the energy storage system according to the embodiment, each of the p combiner units in the direct-current combiner box is connected to the direct-current side positive-negative copper busbar of the power conversion device in the energy storage system through independent power cables, which can avoid the uneven current distribution among the multiple cables connected in parallel with each other between the direct-current combiner box and the direct-current side of the power conversion device in the conventional technology.

For the short circuit protection principle and current limiting principle of the energy storage system, reference may be made to above embodiments, which are not repeated herein.

The embodiments in this specification are described in a progressive way, each of which emphasizes the differences from others, and the same or similar parts among the embodiments can be referred to each other. Since the system disclosed in the embodiments is basically similar to the method therein, the description thereof is relatively simple, and for relevant matters references may be made to the description of the method. The system and embodiments of the system described in the above are merely illustrative. Units described as separate components may be or may not be physically separated. Components shown as units may be or may not be physical units, that is, may be located in one location or may be distributed in multiple network units. Parts or all of the modules may be selected based on actual conditions, to implement the technical solutions of the present disclosure. Those skilled in the art can understand and carry out the present disclosure without any creative effort.

It is to be further understood by those skilled in the art that units described in combination with the disclosed embodiments may be implemented by electronic hardware, computer software or a combination thereof. In order to clearly describe interchangeability of the hardware and the software, the units are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A multi-stage short-circuit protection system of an energy storage system, comprising N stages of fuse units, wherein N is a positive integer greater than two, and wherein
   each of a plurality of battery packs in a battery cabinet of the energy storage system is configured to transmit electric energy through a branch in which a first-stage fuse unit corresponding to the battery pack is arranged,
   the plurality of battery packs is connected to a direct-current side positive-negative copper busbar of a power conversion device of the energy storage system by sharing at least one branch in which a second-stage fuse unit is arranged,
   the direct-current side positive-negative copper busbar of the power conversion device is connected to a main circuit of the power conversion device at a direct-current side of the power conversion device through a branch in which a third-stage fuse unit is arranged, and
   in a case that a short circuit fault occurs at a position on the direct-current side of the power conversion device of the energy storage system, a fuse unit at a stage preceding the position and a fuse unit at a stage following the position are broken;
   wherein,
   a direct-current combiner box of the energy storage system comprises p combiner units, and each of the p combiner units comprises one output positive-negative copper busbar and q input copper positive-negative busbars, wherein p and q are positive integers;
   each of the q input positive-negative copper busbar is configured to transmit electric energy between n battery packs and the output positive-negative copper busbar, wherein n is a positive integer; and
   the output positive-negative copper busbar is connected to the direct-current side positive-negative copper busbar of the power conversion device of the energy storage system through the branch in which the second-stage fuse unit is arranged.

2. The multi-stage short circuit protection system of an energy storage system according to claim 1, wherein
   N is equal to 3,
   a rated current of the first-stage fuse unit is less than a rated current of the second-stage fuse unit, and
   the rated current of the second-stage fuse unit is less than a rated current of the third-stage fuse unit.

3. The multi-stage short-circuit protection system of an energy storage system according to claim 2, wherein
   N is equal to 4, and for each of the p combiner units, each of the q input positive-negative copper busbars in the combiner unit is connected to the output positive-negative copper busbar in the combiner unit through a branch in which a fourth-stage fuse unit is arranged,
   a rated current of the first-stage fuse unit is less than a rated current of the fourth-stage fuse unit,
   the rated current of the fourth-stage fuse unit is less than a rated current of the second-stage fuse unit, and
   the rated current of the second-stage fuse unit is less than a rated current of the third-stage fuse unit.

4. The multi-stage short circuit protection system of an energy storage system according to claim 3, wherein
- in a case that a short circuit fault occurs at a first position between the fourth-stage fuse unit and an input positive-negative copper busbar connected to the fourth-stage fuse unit, the fourth-stage fuse unit and first-stage fuse units connected to the input positive-negative copper busbar are broken;
- in a case that a short circuit fault occurs at a second position between the second-stage fuse unit and an output positive-negative copper busbar connected to the second-stage fuse unit, the second-stage fuse unit and fourth-stage fuse units connected to the output positive-negative copper busbar are broken;
- in a case that a short circuit fault occurs at a third position between the third-stage fuse unit and the direct-current side positive-negative copper busbar, the third-stage fuse unit and second-stage fuse units connected to the direct-current side positive-negative copper busbar are broken;
- in a case that a short circuit fault occurs at a fourth position between the first-stage fuse unit and an input positive-negative copper busbar connected to the first-stage fuse unit, first-stage fuse units connected to the input positive-negative copper busbar and the fourth-stage fuse unit connected to the input positive-negative copper busbar are broken;
- in a case that a short circuit fault occurs at a fifth position between the fourth-stage fuse unit and an output positive-negative copper busbar connected to the fourth-stage fuse unit, fourth-stage fuse units connected to the output positive-negative copper busbar and the second-stage fuse unit connected to the output positive-negative copper busbar are broken; and
- in a case that a short circuit fault occurs at a sixth position between the second-stage fuse unit and the direct-current side positive-negative copper busbar, second-stage fuse units connected to the direct-current side positive-negative copper busbar and the third-stage fuse unit are broken.

5. The multi-stage short circuit protection system of an energy storage system according to claim 1, wherein
- each of the N stages of fuse units comprises a first fuse and a second fuse, which are respectively arranged in a positive branch and a negative branch of a branch in which the fuse unit is arranged, and
- at least one of the first fuse and the second fuse is a quick-protection fuse.

6. The multi-stage short circuit protection system of an energy storage system according to claim 5, wherein in each fuse unit in a direct-current combiner box, the first fuse is a short circuit quick-protection fuse and the second fuse is an overload protection fuse.

7. The multi-stage short circuit protection system of an energy storage system according to claim 6, wherein
- a rated current of the first fuse in the second-stage fuse unit is greater than or equal to current carrying value of a branch in which the second-stage fuse unit is arranged, and
- a rated current of the second fuse in the second-stage fuse unit is less than the current carrying value of the branch in which the second-stage fuse unit is arranged.

8. An energy storage system, comprising:
- a battery cabinet;
- a direct-current combiner box;
- a power conversion device; and
- a multi-stage short circuit protection system, wherein
- the multi-stage short circuit protection system comprises N stages of fuse units, wherein N is a positive integer greater than two;
- the battery cabinet comprises p battery units, and each of the p battery units comprises q×n battery packs, each of the battery packs in the battery cabinet of the energy storage system is configured to transmit electric energy through a branch in which a first-stage fuse unit corresponding to the battery pack is arranged;
- the battery packs are connected to a direct-current side positive-negative copper busbar of a power conversion device of the energy storage system by sharing at least one branch in which a second-stage fuse unit is arranged,
- the direct-current side positive-negative copper busbar of the power conversion device is connected to a main circuit of the power conversion device at a direct-current side of the power conversion device through a branch in which a third-stage fuse unit is arranged, and
- in a case that a short circuit fault occurs at a position on the direct-current side of the power conversion device of the energy storage system, a fuse unit at a stage preceding the position and a fuse unit at a stage following the position are broken;

wherein,
- the direct-current combiner box comprises p combiner units, and each of the p combiner units comprises one output positive-negative copper busbar and q input positive-negative copper busbars connected to the output positive-negative copper busbar, wherein p and q are positive integers;
- each of the battery packs is connected to an input positive-negative copper busbar corresponding to the battery pack through the branch in which the first-stage fuse unit corresponding to the battery pack is arranged;
- each of the q input positive-negative copper busbar is configured to transmit electric energy between n battery packs and the output positive-negative copper busbar, wherein n is a positive integer; and
- the output positive-negative copper busbar is connected to the direct-current side positive-negative copper busbar of the power conversion device through a branch in which a second-stage fuse unit is arranged.

9. The energy storage system according to claim 8, wherein N is equal to 4, and for each of the combiner units, each of the input positive-negative copper busbars in the combiner unit is connected to the output positive-negative copper busbar through a branch in which a fourth-stage fuse unit is arranged.

10. The energy storage system according to claim 8, wherein a branch in which a second-stage fuse unit is arranged further comprises a bidirectional switch arranged between the second-stage fuse unit and an output positive-negative copper busbar connected to the second-stage fuse unit.

11. The energy storage system according to claim 8, wherein the power conversion device is an energy storage inverter, a direct-current converter, or a photovoltaic inverter.

* * * * *